US 8,897,945 B2

(12) United States Patent
Kobayashi et al.

(10) Patent No.: US 8,897,945 B2
(45) Date of Patent: Nov. 25, 2014

(54) ELECTROMOTIVE-VEHICULAR MOTOR CONTROL APPARATUS (75) Inventors: Shinya Kobayashi, Utsunomiya (JP); Dai Saitoh, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/983,999

(22) PCT Filed: Jul. 24, 2012

(86) PCT No.: PCT/JP2012/068643
§ 371 (c)(1),
(2), (4) Date: Aug. 6, 2013

(87) PCT Pub. No.: WO2013/038811
PCT Pub. Date: Mar. 21, 2013

(65) Prior Publication Data
US 2014/0195083 A1    Jul. 10, 2014

(30) Foreign Application Priority Data
Sep. 13, 2011  (JP) .................................. 2011-199405

(51) Int. Cl.
 B60L 9/00    (2006.01)
 B60K 28/16   (2006.01)
 F16H 59/00   (2006.01)
 B60L 5/00    (2006.01)
 B60L 15/20   (2006.01)
 H02P 6/06    (2006.01)

(52) U.S. Cl.
 CPC . *B60L 5/00* (2013.01); *B60L 15/20* (2013.01); *B60L 2240/423* (2013.01); *H02P 6/06* (2013.01); *Y02T 10/644* (2013.01)
 USPC ............................... 701/22; 180/197; 74/335

(58) Field of Classification Search
 USPC .............................. 701/22; 180/65.1; 318/139
 See application file for complete search history.

(56) References Cited

U.S. PATENT DOCUMENTS

| 5,692,471 A * | 12/1997 | Zhang ........................... 123/350 |
| 7,162,353 B2 * | 1/2007 | Minowa et al. ................. 701/96 |
| 7,337,046 B2 * | 2/2008 | Minowa et al. ................. 701/25 |

(Continued)

FOREIGN PATENT DOCUMENTS

| DE | 10-23614 A | 1/1998 |
| JP | 7-143606 A | 6/1995 |
| JP | 7-284290 A | 10/1995 |

(Continued)

OTHER PUBLICATIONS

Search Report issued in International Patent Application No. PCT/JP2012/068643, mailed Sep. 18, 2012, 4 pages.

*Primary Examiner* — Thomas G Black
*Assistant Examiner* — Tyler Paige
(74) *Attorney, Agent, or Firm* — Squire Patton Boggs (US) LLP (57) ABSTRACT This electromotive-vehicular motor control apparatus includes: a motor; a power drive unit; a torque control unit that controls an output torque of the motor; an electric current control unit; a number-of-revolutions detection unit; a target number-of-revolutions setting unit; a number-of-revolutions deviation calculation unit; and a removal unit that outputs a signal of a second number-of-revolutions deviation, in which the torque control unit controls the output torque based on the second number-of-revolutions deviation that has been output from the removal unit.

3 Claims, 6 Drawing Sheets

(56) References Cited

U.S. PATENT DOCUMENTS

| | | | |
|---|---|---|---|
| 7,868,577 B2 * | 1/2011 | Marushita et al. | 318/609 |
| 2001/0014845 A1 * | 8/2001 | Minowa et al. | 701/84 |
| 2003/0100405 A1 * | 5/2003 | Homeyer et al. | 477/174 |
| 2009/0314104 A1 * | 12/2009 | Lohr et al. | 73/862.338 |
| 2013/0013159 A1 * | 1/2013 | Moriki et al. | 701/50 |
| 2013/0304294 A1 * | 11/2013 | Hosoe et al. | 701/22 |

FOREIGN PATENT DOCUMENTS

| | | |
|---|---|---|
| JP | 2000-308215 A | 11/2000 |
| JP | 2004-272741 A | 9/2004 |
| JP | 2009-95145 A | 4/2009 |

* cited by examiner

ELECTROMOTIVE-VEHICULAR MOTOR CONTROL APPARATUS

CROSS REFERENCE TO RELATED APPLICATIONS

This application is a National Stage entry of International Application No. PCT/JP2012/068643, filed Jul. 24, 2012, which claims priority to Japanese Application No. 2011-199405, filed Sep. 13, 2011. The disclosures of the prior applications are hereby incorporated in their entirety by reference.

TECHNICAL FIELD

The present invention relates to an electromotive-vehicular motor control apparatus.

Priority is claimed on Japanese Patent Application No. 2011-199405, filed on Sep. 13, 2011, the content of which is incorporated herein by reference.

BACKGROUND ART

Conventionally, a control apparatus for correcting a torque command value is known. For example, in order to suppress fluctuations in an output torque of a motor due to a vibration from a mechanical system or the like, the control apparatus calculates an average value of detection values of a number of revolutions of the motor. With the average value as a target value of a number of the revolutions, the control apparatus corrects the torque command according to a difference between the target value and the detection value (for example, see Patent Document 1 below.).

However, as with the control apparatus according to the aforementioned conventional techniques, the target value of the number of the revolutions is an average value of the detection values of the number of the revolutions of the motor, or is an output value obtained by a bass pass filter, which extracts only a frequency component at not more than a predetermined frequency from the detection value of the number of the revolutions of the motor. In this case, the average value and the output value have a temporal delay with respect to the detection value. Therefore, there is a possibility that it is difficult to properly correct the torque command due to the temporal delay.

Especially in a transient state of the number of the revolutions during an acceleration or a deceleration of the motor, if out of the difference between the average value or the output value and the detection value, the component due to the aforementioned temporal delay increases, then there arises a problem of inappropriately an excessive correction amount of the torque command.

Against that such a problem occurs, conventionally, for example, the target value of the number of the revolutions of the motor is calculated based on the number of the revolutions of the drive wheels or non-drive wheels of an electric automobile whose traveling drive source is the motor. A control apparatus of the electric automobile is known that uses this method to prevent the occurrence of the temporal delay with respect to the detection value in the target value of the number of the revolutions of the motor (for example, see Patent Document 2 below.).

CITATION LIST

Patent Literature

Patent Document 1: Japanese Unexamined Patent Application, First Publication, No. H07-143606

Patent Document 2: Japanese Unexamined Patent Application, First Publication, No. 2000-308215

SUMMARY OF INVENTION

Problem to be Solved by the Invention

However, according to the control apparatus for the electric automobile according to the aforementioned conventional techniques, the target value of the number of the revolutions of the motor is calculated based on the number of the revolutions of the wheels of the electric automobile, namely, in an indirect manner. This may lead to an increment of errors in computation results along with to complexity of a computational processing.

Furthermore, in the case of calculating the target value of the number of the revolutions based on the number of the revolutions of the non-drive wheels of the electric automobile, for example, in such a case when a idling of the drive wheels which are driven by the motor occurs, there causes a problem in that it is difficult to obtain proper calculation results.

The present invention has been achieved in view of the above problems, while has been preventing complications of the computational processing required for the torque control of the motor, and has an object to provide an electromotive-vehicular motor control apparatus that is capable of properly suppressing fluctuations in the output torque of the motor.

Means for Solving the Problem

To solve the above problems, an aspect of the present invention adopts the following.

(1) An electromotive-vehicular motor control apparatus according to an aspect of the present invention includes a motor that drives wheels; a power drive unit that controls the motor; a torque control unit that controls an output torque of the motor according to a request torque; an electric current control unit that controls an electric-power conversion operation of the power drive unit based on a torque command that is output from the torque control unit and on a detection signal from a current sensor that detects an electric current passed from the power drive unit to the motor; a number-of-revolutions detection unit that detects a number of revolutions of the motor and outputs a signal of a detected number of revolutions, which is a detected result; a target number-of-revolutions setting unit that sets a target number of revolutions for suppressing a torque fluctuation of the motor by using the detected number of the revolutions that has been output from the number-of-revolutions detection unit; a number-of-revolutions deviation calculation unit that calculates a first number-of-revolutions deviation that is a deviation between the target number of the revolutions that has been set by the target number-of-revolutions setting unit and the detected number of revolutions; and a removal unit that outputs a signal of a second number-of-revolutions deviation obtained by removing only a deviation component generated due to a transient state of the number of the revolutions from the first number-of-revolutions deviation that has been calculated by the number-of-revolutions deviation calculation unit, wherein the torque control unit controls the output torque based on the second number-of-revolutions deviation that has been output from the removal unit.

(2) In the electromotive-vehicular motor control apparatus as set forth above in (1), the removal unit may include: a treble pass filter that extracts only a frequency component at not less than a predetermined treble frequency from the first number-of-revolutions deviation and outputs a signal of an extraction result.

(3) In the electromotive-vehicular motor control apparatus as set forth above in (1), the removal unit may include: a bass pass filter that extracts only a frequency component at not more than a predetermined bass frequency from the first number-of-revolutions deviation and outputs a signal of an extraction result; and a difference calculation unit that calculates a difference between a number-of-revolutions deviation of the extraction result that has been output from the bass pass filter and the first number-of-revolutions deviation and outputs a signal of a calculation result.

Effects of the Invention

According to the aspect as described above in (1), against the torque of the motor that is the subject of the control, from the number of the revolutions having a close relationship to the torque of the motor, the target number of the revolutions is conveniently set. In this condition, a deviation component generated due to a transient state of the number of the revolutions is removed from the deviation between the target number of the revolutions and the detected number of revolutions. Thereby, it is possible to properly and precisely suppress the fluctuations in the output torque of the motor while has been preventing complications of the computational processing.

Namely, in the first number-of-revolutions deviation between the target number of the revolutions (the first target number of the revolutions), which has been set based on the detected number of the revolutions, and the detected number of the revolutions, there is contained a deviation component generated due to a transient state of the number of the revolutions. On the other hand, in the second number-of-revolutions deviation, the deviation component generated due to a transient state of the number of the revolutions is not contained. In other words, the second number-of-revolutions deviation is a deviation between the detected number of the revolutions and the target number of the revolutions (the second target number of the revolutions) that does not have a temporal delay with respect to the detected number of the revolutions.

Accordingly, by using of the second number-of-revolutions deviation, it is possible to properly and precisely control the output torque of the motor by means of the target number of the revolutions (the second target number of the revolutions) that does not have a temporal delay generated due to a transient state of the number of the revolutions, and hence, to reduce an electric power consumption required to drive the motor, to thereby improve the acceleration performance.

In the case as described above in (2), the deviation component that is contained in the first number-of-revolutions deviation and is generated due to a transient state of the number of the revolutions is removed, as a steady-state deviation that forms a frequency component at less than a predetermined treble frequency in the first number-of-revolutions deviation, from the first number-of-revolutions deviation by using of the treble pass filter. Thereby, as it were, with easily, properly and precisely, it is possible to obtain the second number-of-revolutions deviation due to the target number of the revolutions (the second target number of the revolutions) that does not have a temporal delay with respect to the detected number of the revolutions.

In the case as described above in (3), a deviation component that is contained in the first number-of-revolutions deviation and is generated due to a transient state of the number of the revolutions is extracted, as a steady-state deviation that forms a frequency component at not more than a predetermined bass frequency in the first number-of-revolutions deviation, from the first number-of-revolutions deviation by using of the bass pass filter. In addition, with the removal of this extraction result from the first number-of-revolutions deviation, with easily, properly and precisely, it is possible to obtain a second number-of-revolutions deviation due to the target number of the revolutions (the second target number of the revolutions) that does not have a temporal delay.

DESCRIPTION OF EMBODIMENTS

Hereunder is a description of an electromotive-vehicular motor control apparatus according to an embodiment of the present invention, with reference to the drawings.

Figure 1:
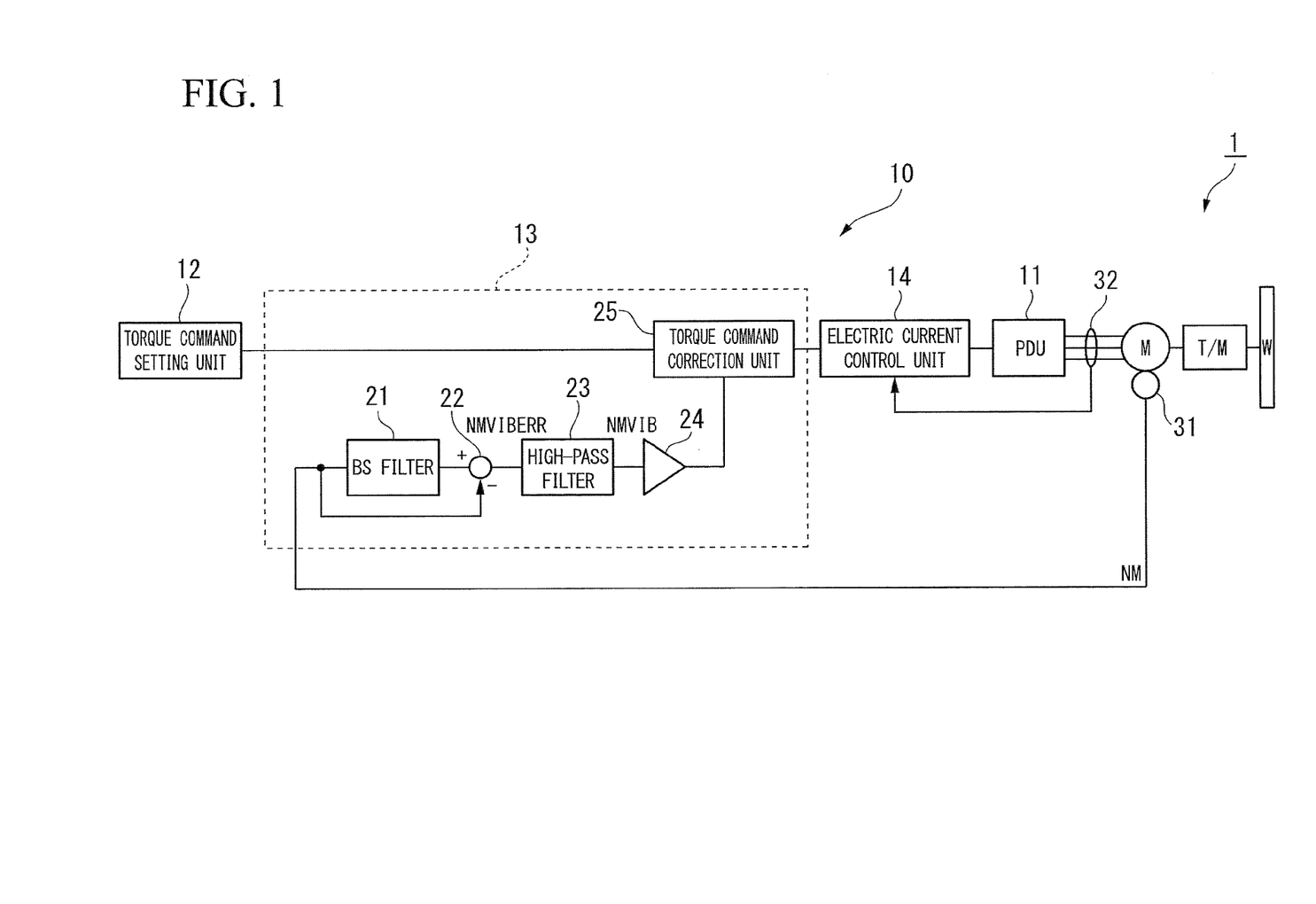
FIG. 1 is a block diagram showing an electromotive-vehicular motor control apparatus according to an embodiment of the present invention.

An electromotive-vehicular motor control apparatus 10 according to the present embodiment is mounted in an electromotive vehicle 1 provided with a traveling motor (M) that is coupled to a drive wheel (W) via a transmission (T/M), for example, as shown in FIG. 1. And, the electromotive-vehicular motor control apparatus 10 includes: a power drive unit (PDU) 11 that controls the traveling motor (M); a torque command setting unit (a torque control unit) 12; a damping control unit 13; and an electric current control unit 14.

The power drive unit 11 is, for example, connected to the traveling motor (M) such as a three-phase brushless DC motor.

The power drive unit 11 includes, for example, a PWM inverter by using of the pulse width modulation (PWM), which includes a bridge circuit where a plurality of switching elements such as transistors is connected in a bridge.

And, for example, when the traveling motor (M) is driven, the power drive unit 11 converts the direct-current power, which is supplied from a direct-current power source such as a battery (not shown in the figure), into the alternating-current power, and supplies it to the traveling motor (M).

Furthermore, for example, when in decelerating the electromotive vehicle 1 or on other occasions, the drive force is transmitted from the drive wheel W side to the traveling motor (M) side, and the traveling motor (M) is functioning as a generator, then a so-called regenerative braking force is generated, a power generation of the alternating (regenerative) electric power that is output from the traveling motor (M) is converted to the direct-current power in order to charge the battery (not shown in the figure).

The torque command setting unit (the torque control unit) 12 sets a torque command in response to an output torque of the traveling motor (M) based on, for example, a request drive force according to the accelerator position angle and the vehicle speed or the like of the electromotive vehicle 1.

For example, based on the signal of the detected result (the detected number of the revolutions NM) that is output from a number-of-revolutions sensor (a number-of-revolutions detection unit) 31 for detecting the number of the revolutions of the traveling motor (M), the damping control unit 13 computes a damping torque for suppressing fluctuations in an output torque of the traveling motor (M) due to a vibration or the like of the drive system. According to the damping torque, the damping control unit 13 then corrects the torque command that is output from the torque command setting unit (the torque control unit) 12.

The damping control unit 13 includes, for example: a vibration removal filter (a target number-of-revolutions setting unit) 21; a number-of-revolutions deviation computation unit (a number-of-revolutions deviation calculation unit) 22; a high-pass filter (a removal unit, a treble pass filter) 23; a damping torque computation unit 24; and a torque command correction unit 25.

The vibration removal filter (the target number-of-revolutions setting unit) 21 is, for example, a BS (a band stop) filter or the like. The vibration removal filter 21 outputs, as a target number of the revolutions (the first target number of the revolutions) NMC, the number of the revolutions that is obtained by the BS (the band stop) filtering process from the detected number of the revolutions NM that has been output from the number-of-revolutions sensor (the number-of-revolutions detection unit) 31. The BS (the band stop) filtering process attenuates a vibrational frequency component in a predetermined frequency band.

Figure 2:
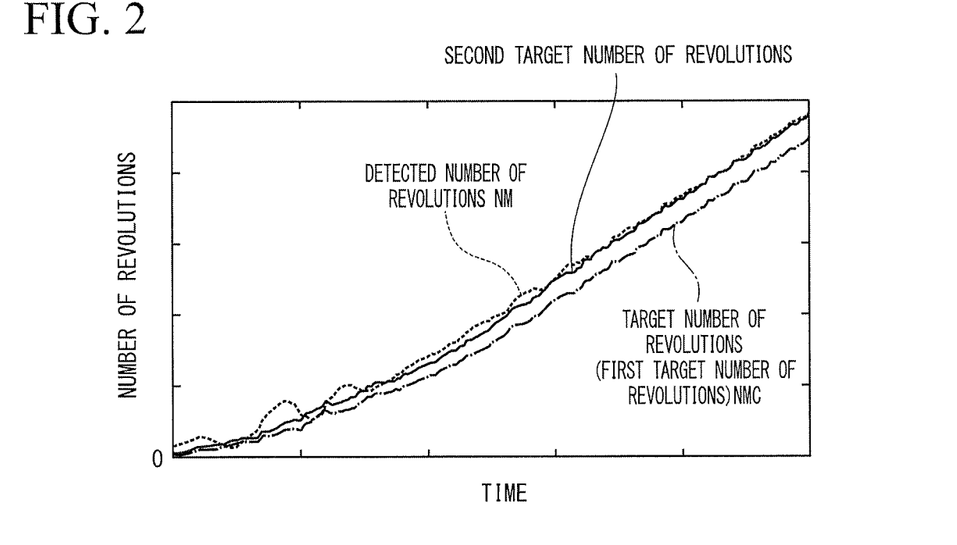
FIG. 2 is a diagram showing exemplary changes in the detected number of the revolutions NM, the target number of the revolutions NMC, and the second target number of the revolutions in the electromotive-vehicular motor control apparatus.

As a result, the target number of the revolutions NMC has a temporal delay with respect to the detected number of the revolutions NM. For example, in a transient state of the number of the revolutions of the traveling motor (M) during acceleration, the target number of the revolutions NMC has a value smaller than that of the detected number of the revolutions NM, as shown in FIG. 2. On the other hand, in a transient state of the number of the revolutions of the traveling motor (M) during deceleration, the target number of the revolutions NMC has a value larger than that of the detected number of the revolutions NM.

The number-of-revolutions deviation computation unit (the number-of-revolutions deviation calculation unit) 22 outputs, as a first number-of-revolutions deviation NMVIBERR, a number-of-revolutions deviation that is obtained by subtracting the detected number of the revolutions NM, which has been output from the number-of-revolutions sensor (the number-of-revolutions detection unit) 31, from the target number of the revolutions NMC, which has been output from the vibration removal filter (the target number-of-revolutions setting unit) 21.

The high-pass filter (the removal unit, the treble pass filter) 23 outputs, as a second number-of-revolutions deviation NMVIB, the number-of-revolutions deviation that is obtained by high-pass filtering process in the first number-of-revolutions deviation NMVIBERR that has been output from the number-of-revolutions deviation computation unit (the number-of-revolutions deviation calculation unit) 22. The high-pass filtering process attenuates a frequency component at less than a predetermined treble cutoff frequency. The second number-of-revolutions deviation NMVIB is the number-of-revolutions deviation for calculating the damping torque.

In the first number-of-revolutions deviation NMVIBERR, there is contained a deviation component generated due to a transient state of the number of the revolutions, because the target number of the revolutions NMC has a temporal delay with respect to the detected number of the revolutions NM.

Figure 3:
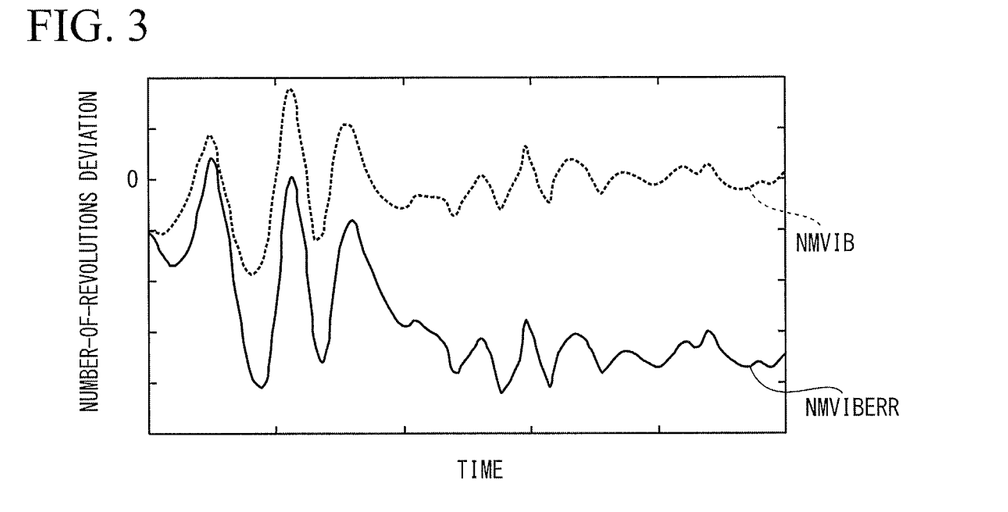
FIG. 3 is a diagram showing exemplary changes in a first number-of-revolutions deviation NMVIBERR and a second number-of-revolutions deviation NMVIB in the electromotive-vehicular motor control apparatus.

As a result, for example in a transient state of the number of the revolutions of the traveling motor (M) during acceleration, the first number-of-revolutions deviation NMVIBERR has a value significantly displaced to the negative side, as shown in FIG. 3. On the other hand, in a transient state of the number of the revolutions of the traveling motor (M) during deceleration, the first number-of-revolutions deviation NMVIBERR has a value significantly displaced to the positive side.

In contrast to this, the second number-of-revolutions deviation NMVIB is obtained by extracting only a frequency component at not less than a predetermined treble cutoff frequency from the first number-of-revolutions deviation NMVIBERR, and by removing a deviation component generated due to a transient state of the number of the revolutions from the first number-of-revolutions deviation NMVIBERR. Therefore, in other words, the second number-of-revolutions deviation NMVIB is a deviation between the detected number of the revolutions NM and the target number of the revolutions (for example, the second target number of the revolutions as shown in FIG. 2) that does not have a temporal delay with respect to the detected number of the revolutions NM.

The damping torque computation unit 24 computes a damping torque TQVUB, for example, by multiplying a second number-of-revolutions deviation NMVIB, which has been output from the high-pass filter (the removal unit, the treble pass filter) 23, by a predetermined damping torque gain GAVIB.

The second number-of-revolutions deviation NMVIB does not contain a deviation component generated due to a transient state of the number of the revolutions. Therefore, as shown for example in FIG. 4, the damping torque TQVUB does not contain a component due to a temporal delay that the target number of the revolutions NMC has with respect to the detected number of the revolutions NM.

Figure 4:
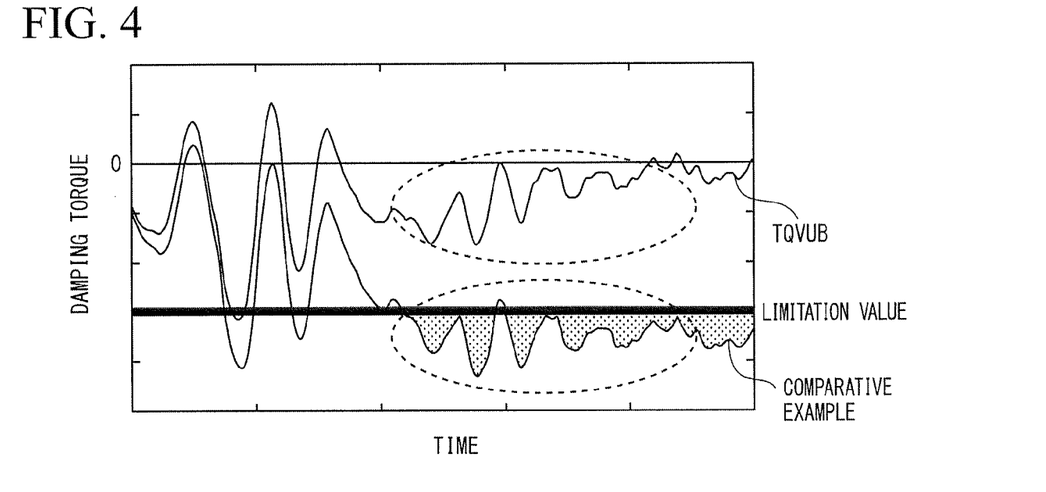
FIG. 4 is a diagram showing an exemplary change in a damping torque TQVUB in the electromotive-vehicular motor control apparatus and an exemplary change in a damping torque in a comparative example thereof.

Namely, in other words, the damping torque TQVUB is calculated based on the target number of the revolutions (the second target number of the revolutions) that does not have a temporal delay with respect to the detected number of the revolutions NM.

According to the damping torque TQVUB, displacement such as to exceed an appropriate limitation value due to a transient state of the number of the revolutions is prevented from being generated, as is the case of a damping torque in a comparative example where the component does not remove due to a temporal delay that the target number of the revolutions NMC has with respect to the detected number of the revolutions NM.

For example, by adding a damping torque TQVUB (which has been output from the damping torque computation unit 24) to a torque command (which has been output from the torque command setting unit (the torque control unit) 12) or by performing other operations, the torque command correction unit 25 corrects a torque command that has been output from the torque command setting unit (the torque control unit) 12. The torque command correction unit 25 then outputs the corrected torque command.

The electric current control unit 14 performs, for example, a feedback control of an electric current passed through the traveling motor (M) based on a torque command that is output from the damping control unit 13 and on a detection signal that is output from a current sensor 32 for detecting an electric current energized from the power drive unit 11 to the traveling motor (M). Furthermore, the electric current control unit 14 also outputs a control signal for controlling an electric-power conversion operation of the power drive unit 11.

The electromotive-vehicular motor control apparatus 10 according to the present embodiment has structures as described above. Next is a description of an operation of the electromotive-vehicular motor control apparatus 10, especially, a computing process of a damping torque TQVUB to correct a torque command.

Figure 5:
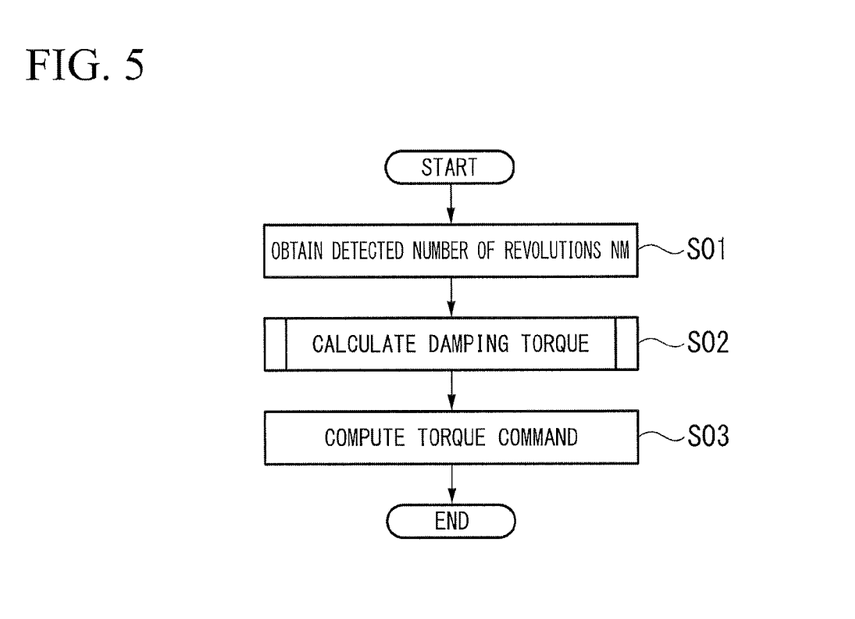
FIG. 5 is a flow chart showing an operation of the electromotive-vehicular motor control apparatus.

Firstly, for example, in the step S01 as shown in FIG. 5, the detected number of the revolutions NM of the traveling motor (M) is obtained.

Subsequently, in the step S02, by performing the calculating process of a damping torque, (described later), the damping torque TQVUB is calculated.

Subsequently, in the step S03, for example, the torque command based on a requested driving force according to the accelerator position angle and the vehicle speed of the electromotive vehicle 1. And in the step S03, the torque command is corrected by using of the damping torque TQVUB, to thereby compute a corrected torque command. The process then moves to the END.

The calculating process of the damping torque in the step S02 as described above will be described below.

Figure 6:
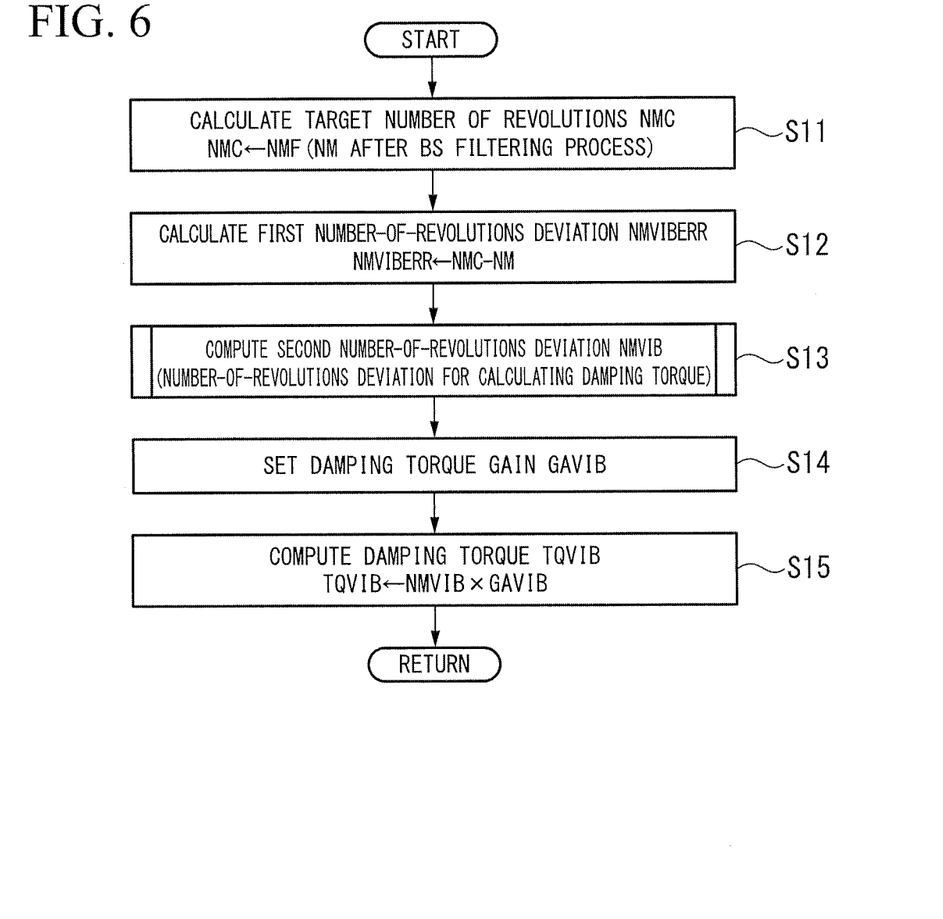
FIG. 6 is a flow chart showing the calculating process of the damping torque shown in FIG. 5.

Firstly, for example, in the step S11 as shown in FIG. 6, for the detected number of the revolutions NM that has been output from the number-of-revolutions sensor (the number-of-revolutions detection unit) 31, for example, the filtering process of attenuating a vibrational frequency component in a predetermined frequency band by using of the BS (the band stop) filter is performed on. The number of the revolutions NMF that is obtained by the filtering process is used as a target number of the revolutions NMC.

Subsequently, in the step S12, the first number-of-revolutions deviation NMVIBERR is calculated by subtracting the detected number of the revolutions NM from the target number of the revolutions NMC.

Subsequently, in the step S13, the calculating process of the number-of-revolutions deviation for calculating a damping torque is performed (described later).

Subsequently, in the step S14, a predetermined damping torque gain GAVIB is set.

Subsequently, in step S15, the second number-of-revolutions deviation NMVIB, which has been output from the high-pass filter (the removal unit, the treble pass filter) 23, is multiplied by the predetermined damping torque gain GAVIB, in order to compute the damping torque TQVUB. The process then moves to the RETURN.

The calculating process of the number-of-revolutions deviation for calculating the damping torque in the step S13 as described above will be described below.

Figure 7:
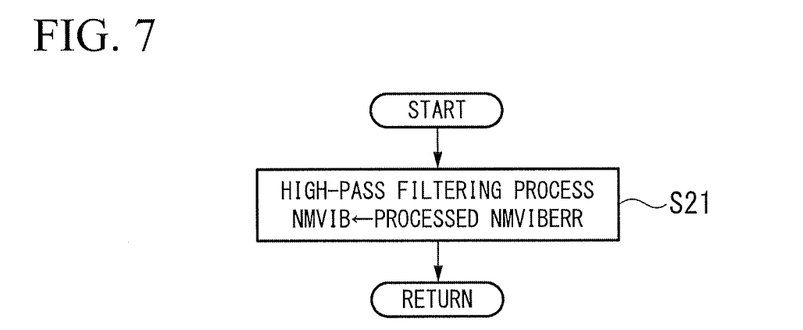
FIG. 7 is a flow chart showing the calculating process of a number-of-revolutions deviation for calculating a damping torque shown in FIG. 6.

For example, in the step S21 as shown in FIG. 7, for the first number-of-revolutions deviation NMVIBERR, the high-pass filtering process of attenuating a frequency component at less than a predetermined treble cutoff frequency is performed. And the number-of-revolutions deviation (a processed NMVIBERR), which is obtained by the high-pass filtering process, is output as the second number-of-revolutions deviation NMVIB, which is the number-of-revolutions deviation for calculating the damping torque. The process then moves to the RETURN.

As described above, according to the electromotive-vehicular motor control apparatus 10 of the present embodiment, based on the number of the revolutions, which has a close relationship with the output torque of the traveling motor (M) as a control target, the target number of the revolutions NMC is set easily. Then, by removing the deviation component, which is due to the transient state of the number of the revolutions, from the deviation (the first number-of-revolutions deviation NMVIBERR) between the target number of the revolutions NMC and the detected number of the revolutions NM, to thereby make it possible to suppress the fluctuations in the output torque of the traveling motor (M) with properly and precisely, while preventing that the computational processing is complicated. Furthermore, it is possible to reduce the power consumption required for driving the traveling motor (M) and to improve the acceleration performance.

Namely, in the first number-of-revolutions deviation NMVIBERR between the target number of the revolutions (the first target number of the revolutions) NMC, which is set based on the detected number of the revolutions NM, and the detected number of the revolutions NM, there is contained a deviation component generated due to the transient state of the number of the revolutions. On the other hand, in the second number-of-revolutions deviation NMVIB, the deviation component due to the transient state of the number of the revolutions is not contained. In other words, the second number-of-revolutions deviation NMVIB is a deviation between the detected number of the revolutions NM and the target number of the revolutions (the second target number of the revolutions) that does not have a temporal delay with respect to the detected number of the revolutions NM.

Accordingly, the use of the second number-of-revolutions deviation NMVIB makes it possible to control the output torque of the traveling motor (M) with properly and precisely by means of the target number of the revolutions (the second target number of the revolutions) that does not have a temporal delay due to the transient state of the number of the revolutions.

Furthermore, the deviation component that is contained in the first number-of-revolutions deviation NMVIBERR and is generated due to the transient state of the number of the revolutions is removed, as a steady-state deviation that forms a frequency component at less than a predetermined treble cutoff frequency in the first number-of-revolutions deviation NMVIBERR, from the first number-of-revolutions deviation NMVIBERR by using of the high-pass filter (the removal unit, the treble pass filter) 23. Thereby, it is possible to obtain the second number-of-revolutions deviation NMVIB properly and precisely with ease by using of the target number of the revolutions (the second target number of the revolutions) that does not have a temporal delay with respect to the detected number of the revolutions NM.

Figure 8:
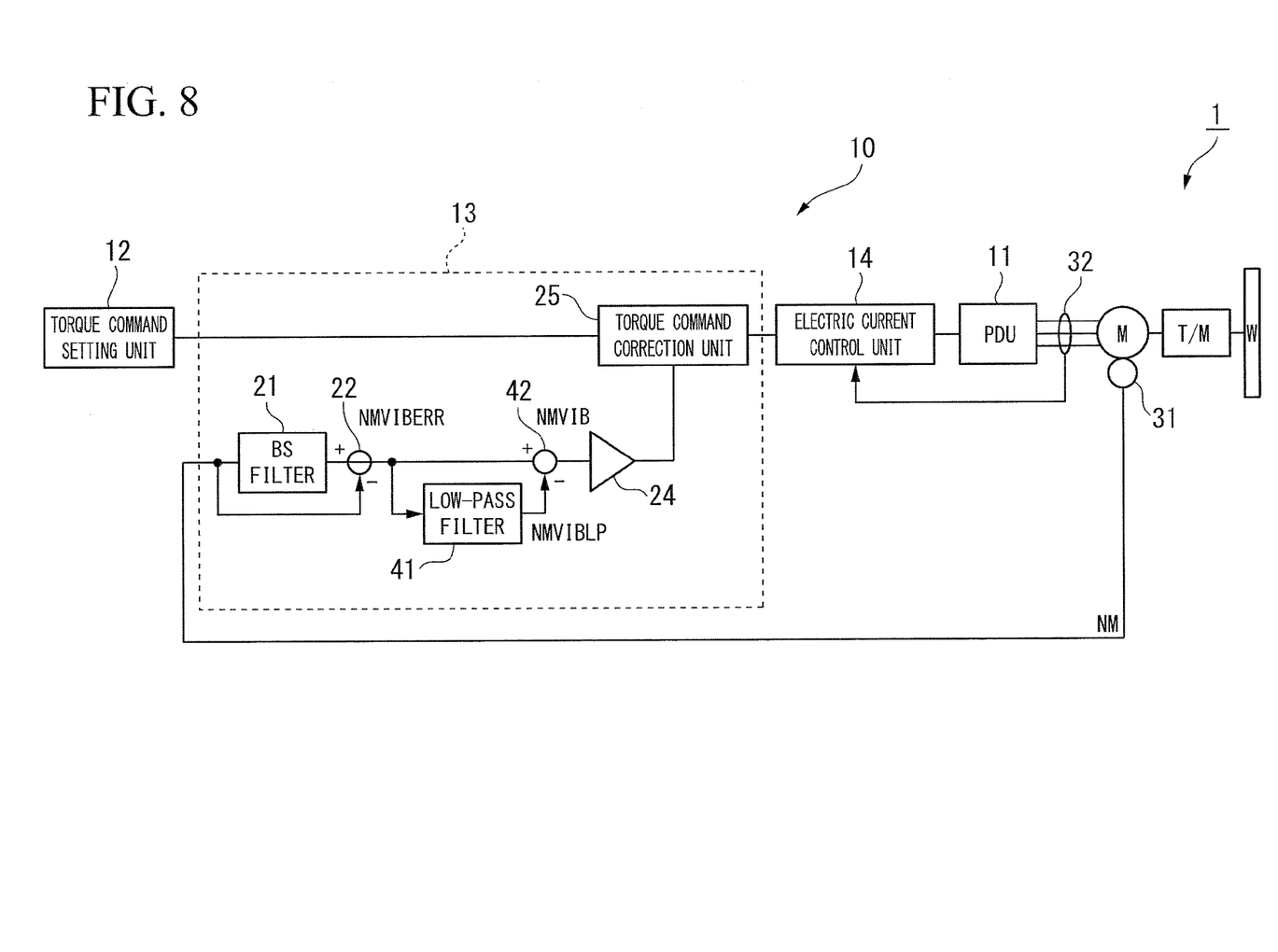
FIG. 8 is a block diagram showing an electromotive-vehicular motor control apparatus according to a modification of the embodiment of the present invention.

Incidentally, in the aforementioned embodiment, the damping control unit 13 includes the high-pass filter (the removal unit, the treble pass filter) 23. However, the present invention is not limited to this. For example, as is the case with a modification as shown in FIG. 8, the damping control unit 13 may include a low-pass filter (a removal unit, a bass pass filter) 41 and a difference calculation unit (a removal unit, a difference calculation unit) 42, instead of the high-pass filter (the removal unit, the treble pass filter) 23.

In the modification, the low-pass filter (the removal unit, the bass pass filter) 41, in the first number-of-revolutions deviation NMVIBERR that has been output from the number-of-revolutions deviation computation unit (the number-of-revolutions deviation calculation unit) 22, outputs the number-of-revolutions deviation that is obtained by the low-pass filtering process as a processed number-of-revolutions deviation NMVIBLP. The low-pass filtering process attenuates a frequency component higher than a predetermined bass cutoff frequency.

The difference calculation unit (the removal unit, the difference calculation unit) 42 outputs the number-of-revolutions deviation obtained by subtracting the processed number-of-revolutions deviation NMVIBLP, which has been output from the low-pass filter (the removal unit, the bass pass filter) 41, from the first number-of-revolutions deviation NMVIBERR, which has been output from the number-of-revolutions deviation computation unit (the number-of-revolutions deviation calculation unit) 22, as a second number-of-revolutions deviation NMVIB. The second number-of-revolutions deviation NMVIB is the number-of-revolutions deviation for calculating the damping torque.

In the first number-of-revolutions deviation NMVIBERR, there is contained a deviation component generated due to a transient state of the number of the revolutions, because the target number of the revolutions NMC has a temporal delay with respect to the detected number of the revolutions NM.

Figure 9:
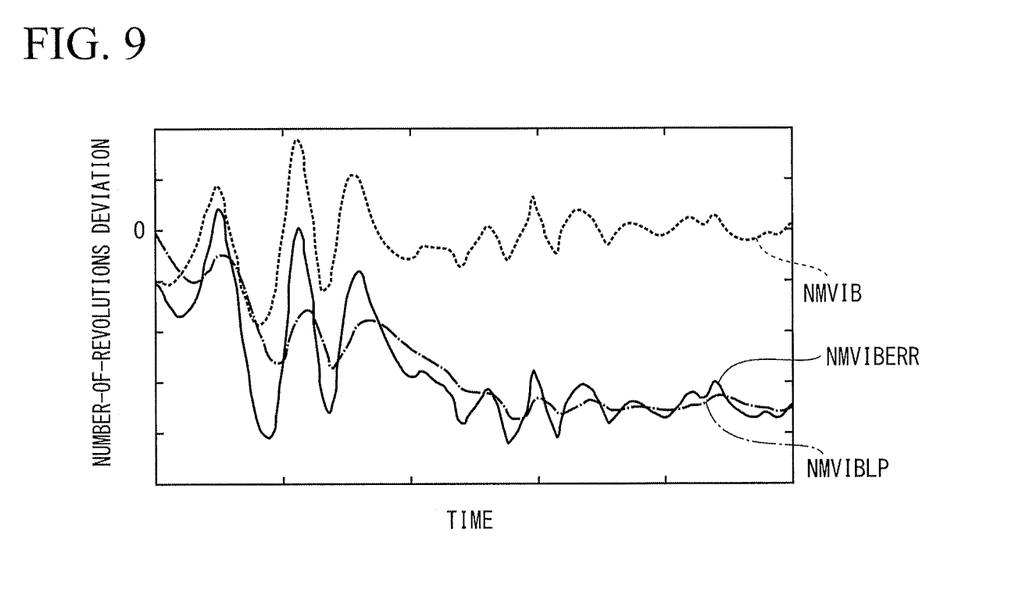
FIG. 9 is a diagram showing exemplary changes in a first number-of-revolutions deviation NMVIBERR, a processed number-of-revolutions deviation NMVIBLP, and a second number-of-revolutions deviation NMVIB in the electromotive-vehicular motor control apparatus according to the modification of the embodiment of the present invention.

As a result, for example, in a transient state of the number of the revolutions of the traveling motor (M) during acceleration, as shown in FIG. 9, the first number-of-revolutions deviation NMVIBERR has a value significantly displaced to the negative side. On the other hand, in a transient state of the number of the revolutions of the traveling motor (M) during deceleration, the first number-of-revolutions deviation NMVIBERR has a value significantly displaced to the positive side.

On the other hand, the processed number-of-revolutions deviation NMVIBLP is obtained by extracting only a deviation component generated due to a transient state of the number of the revolutions, namely, only a frequency component at not more than a predetermined bass cutoff frequency, from the first number-of-revolutions deviation NMVIBERR.

And the second number-of-revolutions deviation NMVIB is obtained by removing the processed number-of-revolutions deviation NMVIBLP from the first number-of-revolutions deviation NMVIBERR. Therefore, in other words, the second number-of-revolutions deviation NMVIB is a deviation between the detected number of the revolutions NM and the target number of the revolutions (the second target number of the revolutions) that does not have a temporal delay with respect to the detected number of the revolutions NM.

In the modification, in the step S13 of the aforementioned embodiment, the calculating process of the number-of-revolutions deviation for calculating a damping torque corresponds to the following processes in step S31 and the step S32.

Figure 10:
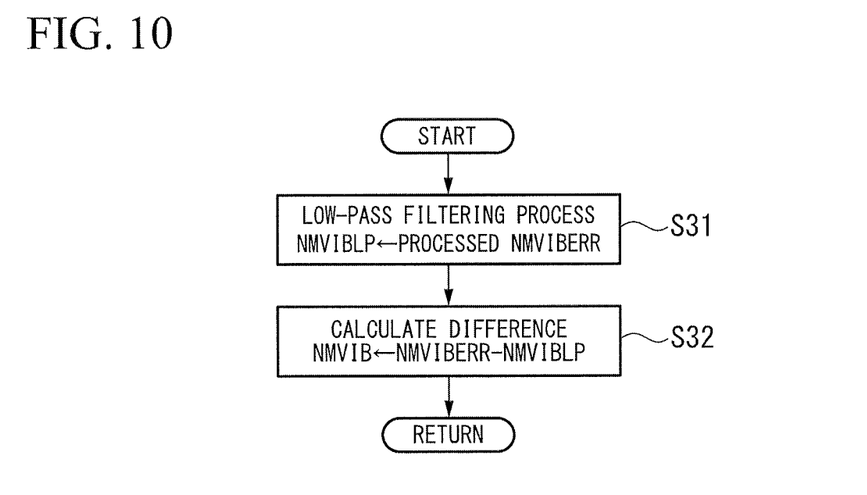
FIG. 10 is a flow chart showing the calculating process of a number-of-revolutions deviation for calculating a damping torque in the electromotive-vehicular motor control apparatus according to the modification of the embodiment of the present invention.

For example, in the step S31 shown in FIG. 10, a low-pass filtering process of attenuating a frequency component higher than a predetermined bass cutoff frequency is performed for the first number-of-revolutions deviation NMVIBERR. The number-of-revolutions deviation (the processed NMVIBERR) obtained by the low-pass filtering process is output as a processed number-of-revolutions deviation NMVIBLP.

Subsequently, in the step S32, the number-of-revolutions deviation obtained by subtracting the processed number-of-revolutions deviation NMVIBLP from the first number-of-revolutions deviation NMVIBERR is output as a second number-of-revolutions deviation NMVIB, which is a number-of-revolutions deviation for calculating a damping torque. The process then moves to the RETURN.

According to the modification, a deviation component that is contained in the first number-of-revolutions deviation NMVIBERR and is generated due to a transient state of the number of the revolutions is extracted by using of the low-pass filter (the removal unit, the bass pass filter) 41 from the first number-of-revolutions deviation NMVIBERR, as a steady-state deviation that forms a frequency component at not more than a predetermined bass cutoff frequency in the first number-of-revolutions deviation NMVIBERR. In addition, with the removal of this extraction result from the first number-of-revolutions deviation NMVIBERR, it is possible to obtain the second number-of-revolutions deviation NMVIB properly and precisely with ease, by using of the target number of the revolutions (the second target number of the revolutions) that does not have a temporal delay with respect to the detected number of the revolutions NM.

Incidentally, in the aforementioned embodiment, the vibration removal filter (the target number-of-revolutions setting unit) 21 is not limited to a BS (a band stop) filter, and may be another filter.

Furthermore, in the aforementioned embodiment, it is preferable that the frequency band, that is attenuated by the vibration removal filter (the target number-of-revolutions setting unit) 21, is different from the frequency band, that is extracted by the high-pass filter (the removal unit, the treble pass filter) 23.

Furthermore, in the aforementioned modification of the embodiment, it is preferable that the frequency band that is attenuated by the vibration removal filter (the target number-of-revolutions setting unit) 21 is set to be different from the frequency band that is attenuated by the low-pass filter (the removal unit, the bass pass filter) 41.

The present embodiment described above is only exemplary in carrying out the present invention. Obviously, the present invention should not be interpreted based only on the aforementioned embodiment.

INDUSTRIAL APPLICABILITY

According to the electromotive-vehicular motor control apparatus of the present invention, the target number of the revolutions of a motor as a control target is set easily from the number of the revolutions thereof that is closely related to the torque thereof. In this condition, a deviation component generated due to a transient state of the number of the revolutions is removed from the deviation between the target number of the revolutions and the detected number of the revolutions. Thereby, it is possible to suppress the fluctuations in the output torque of the motor with properly and precisely, while preventing that the computational processing is complicated.

REFERENCE SIGNS LIST

1: electromotive vehicle
10: electromotive-vehicular motor control apparatus
11: power drive unit (PDU)
12: torque command setting unit (torque control unit)
13: damping control unit
14: electric current control unit
21: vibration removal filter (target number-of-revolutions setting unit)
22: number-of-revolutions deviation computation unit (number-of-revolutions deviation calculation unit)
23: high-pass filter (removal unit, treble pass filter)
24: damping torque computation unit
25: torque command correction unit
31: number-of-revolutions sensor (number-of-revolutions detection unit)
32: current sensor
41: low-pass filter (removal unit, bass pass filter)
42: difference calculation unit (removal unit, difference calculation unit)
M: traveling motor
T/M: transmission
W: drive wheel

The invention claimed is:

1. An electromotive-vehicular motor control apparatus, comprising:
a motor that drives wheels;
a power drive unit that controls the motor;
a torque control unit that controls an output torque of the motor according to a request torque;
an electric current control unit that controls an electric-power conversion operation of the power drive unit based on a torque command that is output from the torque control unit and on a detection signal from a current sensor that detects an electric current passed from the power drive unit to the motor;
a number-of-revolutions detection unit that detects a number of revolutions of the motor and outputs a signal of a detected number of revolutions, which is a detected result;
a target number-of-revolutions setting unit that sets a target number of revolutions for suppressing a torque fluctuation of the motor by using the detected number of the revolutions that has been output from the number-of-revolutions detection unit;
a number-of-revolutions deviation calculation unit that calculates a first number-of-revolutions deviation that is a deviation between the target number of the revolutions that has been set by the target number-of-revolutions setting unit and the detected number of the revolutions; and
a removal unit that outputs a signal of a second number-of-revolutions deviation obtained by removing only a deviation component generated due to a transient state of the number of the revolutions from the first number-of-revolutions deviation that has been calculated by the number-of-revolutions deviation calculation unit, wherein
the torque control unit controls the output torque based on the second number-of-revolutions deviation that has been output from the removal unit.

2. The electromotive-vehicular motor control apparatus according to claim 1, wherein
the removal unit comprises:
a treble pass filter that extracts only a frequency component at not less than a predetermined treble frequency from the first number-of-revolutions deviation and outputs a signal of an extraction result.

3. The electromotive-vehicular motor control apparatus according to claim 1, wherein
the removal unit comprises:
a bass pass filter that extracts only a frequency component at not more than a predetermined bass frequency from the first number-of-revolutions deviation and outputs a signal of an extraction result; and
a difference calculation unit that calculates a difference between a number-of-revolutions deviation of the extraction result that has been output from the bass pass filter and the first number-of-revolutions deviation, and outputs a signal of a calculation result.

* * * * *